Patented June 4, 1929.

1,715,892

UNITED STATES PATENT OFFICE.

ARMAN E. BECKER, OF ELIZABETH, NEW JERSEY, AND ARTHUR B. BOEHM, OF SARANAC LAKE, NEW YORK, ASSIGNORS TO STANDARD OIL DEVELOPMENT COMPANY.

LEATHER OIL AND PROCESS OF MAKING THE SAME.

No Drawing. Application filed July 27, 1925. Serial No. 46,499.

This invention relates to improvements in "leather oils", that is, oils adapted especially for the treatment of leather after the tanning, washing, or drumming operation which is incident to the preparation of the hides. If the leather were allowed to dry without proper treatment after such operations, it would become hard, stiff, and brittle. Cod oil (cod liver oil) has heretofore been used extensively as a leather oil. The present composition has numerous advantages, particularly the power to penetrate readily into the leather and to soften and furnish internal lubrication to its fibre bundles, notwithstanding the presence of water in the leather. The composition emulsifies easily with water to form relatively stable emulsions. This is a highly important property. The improved composition does not require the presence of a large percentage of animal or fish oil to secure the desired penetration and other effects. Our composition is not subject to substantial loss by dripping or evaporation from the treated leather. Leather treated with this oil is ordinarily uniform in color, pliable, and free from crackiness of grain.

In preparing the improved composition, any suitable mineral oil may be used, preferably of the lubricating type and within the viscosity range stated.

The preferred emulsifying agent oil soluble sodium sulfonate, may be prepared in the well-known manner by alcohol extraction of oil which has been acid treated and neutralized for the production of white oils or the like. This sodium sulfonate frequently contains a small amount of residual alkali, usually less than 1.5 to 2%. When this is the case we prefer to add cod oil (cod liver oil) in amount sufficient to neutralize residual alkali. The cod oil is converted into a soap which imparts desirable properties to the composition. Other organic neutralizing compounds, such as animal or vegetable oils, saponifiable by alkali in the presence of oil, may be used. It is feasible to neutralize excess caustic before incorporating the sulfonate in the oil, but the procedure described is generally more convenient.

The following ingredients may be present when a typical alkali-containing sulfonate is used:

| | Per cent. |
|---|---|
| Mineral red oil | 90 |
| Sodium sulfonate | 8.5 |
| Cod oil soap | 1.5 |

The improved leather oil is made up as follows: The sodium sulfonate is dissolved in the mineral oil. Heating and stirring may be necessary to secure quick solution of the sulfonate. When there is residual alkali to be neutralized, cod oil or the like is added and the mixture is heated and stirred. The oil is next allowed to cool and settle, during which some insoluble impurities may settle out. Additional cod oil or other fatty material, such as olive oil, neat's-foot oil, sperm oil, tallow, or mixtures of these, may be added, if desired.

The preferred proportions given may vary widely. For example, we may use as much as 30% of sodium sulfonate. Although higher percentages of sodium sulfonate may be used, ordinarily no advantage is derived from so doing. Less than 5% of sodium sulfonate will not in general give the desired result. Other alkali metal sulfonates may be substituted for sodium sulfonate.

The leather oil of the present invention is ordinarily prepared for sale in substantially anhydrous form. However, we contemplate in some cases preparing compositions containing water. In the treatment of light weight and fancy leathers the composition will ordinarily be emulsified with water. It may be used in emulsified condition, either alone or as a carrier for animal or fish oils. For sole leather, belting butts, and the like, the composition may be used as such or in admixture with various percentages of animal or fish oils.

We claim:

1. A composition adapted for use as a leather oil, or the like, comprising a mineral oil of lubricating grade containing a substantial amount of oil-soluble sulfonate derived from the acid treating of petroleum oil, and a fatty oil.

2. A composition adapted for use as a leather oil, or the like, comprising a mineral oil of lubricating grade, oil-soluble sodium sulfonate derived from the acid treating of petroleum oil, and a saponified organic oil.

3. A leather oil comprising a mineral oil of lubricating grade, oil-soluble sodium sulfonate and a cod oil soap.

4. A composition adapted for use as a leather oil, or the like, comprising about 90% mineral red oil, 8.5% oil-soluble sodium sulfonate, and 1.5% cod oil soap.

5. Process of making a composition adapted for use as a leather oil, or the like, comprising mixing a mineral oil of lubricating grade and an oil-soluble sulfonate derived from the acid treating of petroleum oil and containing free alkali, and reacting upon such alkali with a saponifiable organic material.

6. Process of making a composition adapted for use as a leather oil, or the like, comprising mixing a mineral oil of lubricating grade and an oil-soluble sulfonate containing free alkali, adding a saponifiable fish oil to react with such alkali, heating and stirring the mixture to facilitate neutralization, cooling, settling, and removing any deposited impurities.

ARMAN E. BECKER.
ARTHUR B. BOEHM.